(12) United States Patent
Blais

(10) Patent No.: US 12,242,646 B2
(45) Date of Patent: Mar. 4, 2025

(54) ACCESS RESTRICTION OF VEHICLE-ASSOCIATED INFORMATION

(71) Applicant: BlackBerry Limited, Waterloo (CA)

(72) Inventor: Pierre Pierre Blais, Kanata (CA)

(73) Assignee: BlackBerry Limited, Waterloo (CA)

( * ) Notice: Subject to any disclaimer, the term of this patent is extended or adjusted under 35 U.S.C. 154(b) by 229 days.

(21) Appl. No.: 18/050,611

(22) Filed: Oct. 28, 2022

(65) Prior Publication Data

US 2024/0143830 A1    May 2, 2024

(51) Int. Cl.
*G06F 21/62* (2013.01)
*G06F 21/31* (2013.01)

(52) U.S. Cl.
CPC .......... *G06F 21/6245* (2013.01); *G06F 21/31* (2013.01)

(58) Field of Classification Search
CPC .............................. G06F 21/6245; G06F 21/31
See application file for complete search history.

(56) References Cited

U.S. PATENT DOCUMENTS

| 8,327,451 | B2 | 12/2012 | Duri et al. | |
| 9,043,938 | B1 * | 5/2015 | Raghu | H04L 63/0846 726/28 |
| 2011/0119614 | A1 * | 5/2011 | Powell | G06F 16/435 711/E12.001 |
| 2019/0193682 | A1 * | 6/2019 | Santiano | G08G 1/207 |
| 2019/0356738 | A1 * | 11/2019 | Haidar | H04L 67/12 |
| 2020/0114924 | A1 * | 4/2020 | Chen | B60W 40/09 |
| 2022/0128367 | A1 | 4/2022 | Uchida et al. | |

OTHER PUBLICATIONS

Author Unknown, Ford Explorer Owner's Manual 2023, Sep. 30, 2022 (retrieved on Dec. 14, 2023) (13 pages).
European Patent Office, Extended European Search Report for Appl. No. 23203166.6 dated Dec. 22, 2023 (7 pages).
W3C, Viss version 2—Core, W3C Working Draft, Aug. 16, 2022 (46 pages).

* cited by examiner

*Primary Examiner* — Ayoub Alata
(74) *Attorney, Agent, or Firm* — Trop Pruner & Hu, P.C.

(57) ABSTRACT

In some examples, a system receives vehicle-associated information from a data source associated with a vehicle, and restricts access to the vehicle-associated information based on at least one privacy criterion selected from among a machine learning use criterion relating to use of the vehicle-associated information by a machine learning model, a vehicle motion criterion relating to a movement status of the vehicle, or a person identity criterion relating to an identity of a person in the vehicle.

20 Claims, 3 Drawing Sheets

ACCESS RESTRICTION OF
VEHICLE-ASSOCIATED INFORMATION

BACKGROUND

A vehicle can include or receive data from sources that provide vehicle-associated information. Data sources can be internal or external to the vehicle. Entities, whether internal or external to the vehicle, may attempt to access vehicle-associated information.

BRIEF DESCRIPTION OF THE DRAWINGS

Some implementations of the present disclosure are described with respect to the following figures.

Figure 1:
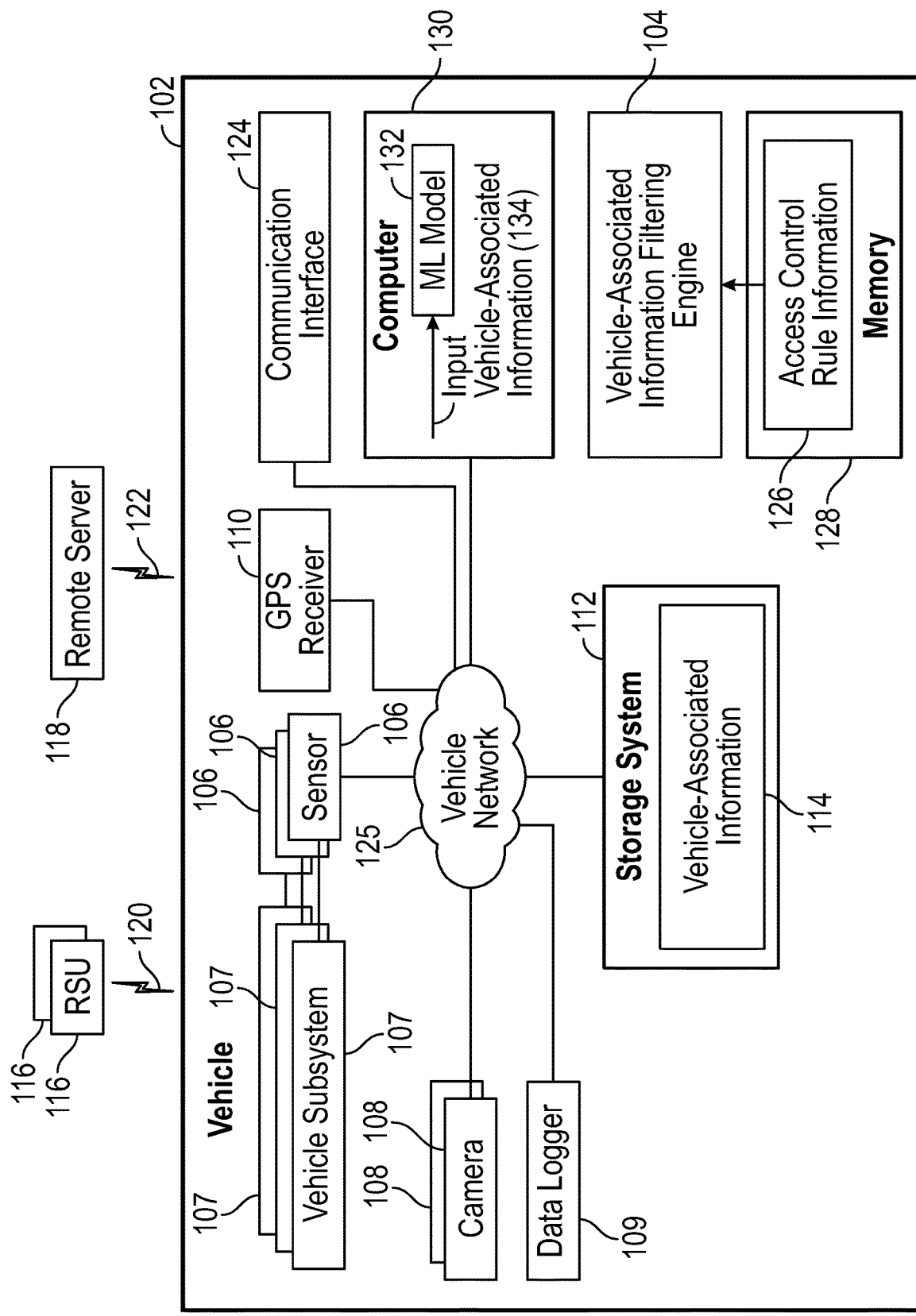
FIG. 1 is a block diagram of a vehicle and a vehicle-associated information filtering engine according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

It may be desirable to restrict access to vehicle-associated information to protect privacy (e.g., the privacy of an occupant in the vehicle, the privacy of an owner of the vehicle, etc.), to provide security, or for other purposes. In some examples, access to vehicle-associated information can be based on permissions associated with requesting entities, such as users, programs, or machines. An access permission can specify whether an entity is permitted to access vehicle-associated information. The access permission may be an all or nothing permission, i.e., the requesting entity may either have full access of the vehicle-associated information or have no access to the vehicle-associated information. The coarseness in the granularity of access control using permissions may result either in too much vehicle-associated information being exposed, or too little vehicle-associated information being provided.

Examples of vehicle-associated information can include any or some combination of the following: data from sensors of a vehicle (e.g., a speedometer that measures the speed of a vehicle, an accelerometer that measures the acceleration of a vehicle, a vehicle fluid monitoring sensor, a tire pressure sensor, a temperature sensor, a pressure sensor, a humidity sensor, an engine speed sensor, etc.), location data of a vehicle, a still or video image (of an interior or exterior of the vehicle), data stored in a storage medium in the vehicle, identification information relating to an occupant (driver or passenger) of a vehicle, data pertaining to use of safety equipment (e.g., a seatbelt, an anti-lock brake, an anti-collision control system, etc.) of a vehicle, data relating to facial recognition or other biometric data, data pertaining to an occupant of a vehicle (e.g., weight, seat position, and so forth), or any other vehicle-associated information.

Vehicle-associated information can be generated from a data source in the vehicle, or alternatively or additionally, can be generated by a data source external to the vehicle. For example, the data source can be part of a roadside unit (RSU), a remote server, and so forth. Examples of RSUs can include traffic lights, electronic road signs, or any other electronic equipment that is located on or near a road over which vehicles travel. A remote server can refer to a computer system (including a computer or multiple computers), such as a computer system that is part of a cloud, a data center, a web environment, and so forth.

FIG. 1 is a block diagram of an example arrangement that includes a vehicle 102 that has a vehicle-associated information filtering engine 104 according to some implementations of the present disclosure. The vehicle-associated information filtering engine 104 is used to control access by entities (users, programs, and/or machines) of vehicle-associated information from various data sources. The entities that may request access of the vehicle-associated information can include entities internal to the vehicle 102 or external to the vehicle 102. The access control of vehicle-associated information to the various entities can provide some or all of the following benefits: data privacy is enhanced by reducing a sampling rate at which vehicle-associated information is provided to an entity, data privacy is enhanced by controlling when vehicle-associated information is made available to an entity based on one or more criteria (e.g., motion status or ignition status of vehicle, speed of vehicle, time, location, occupant identity, etc.), and so forth.

Although FIG. 1 shows the vehicle-associated information filtering engine 104 inside the vehicle 102, in other examples, the vehicle-associated information filtering engine 104 can be located externally to the vehicle 102. For example, the vehicle-associated information filtering engine 104 can be part of an RSU 116, a remote server 118, and so forth.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

Various example data sources of vehicle-associated information are depicted in FIG. 1. Data sources can be located in the vehicle 102, including sensors 106, cameras 108, a data logger 109, a Global Positioning System (GPS) receiver 110 to receive location data from GPS satellites, a storage system 112, or other data sources. Data sources external to the vehicle 102 that can provide vehicle-associated information can be part of RSUs 116, a remote server 118, and so forth.

The sensors 106 in the vehicle 102 can be coupled to respective vehicle subsystems 107, such as any or some combination of the following: a vehicle engine, a vehicle transmission, brakes, tires, a sound system, batteries, a suspension, a navigation system, a climate control system, a seatbelt, airbags, an anti-collision system, or any other vehicle subsystem.

The sensors 106 are used to measure metrics representing characteristics of the vehicle subsystems 107, including characteristics relating to operations of a vehicle subsystem 107, wear of a vehicle subsystem 107, errors or faults in a vehicle subsystem 107, and so forth.

In further examples, the sensors 106 can be used to make environmental measurements of an environment either inside the vehicle 102 and/or outside of vehicle 102. Examples of environmental metrics that can be measured by environmental sensors include any or some combination of the following: a temperature, a pressure, a humidity, and so forth. Sensors can also be used to detect road conditions on which the vehicle 102 is traveling, such as whether potholes are present in the road, whether the road is paved or unpaved, and so forth.

The cameras 108 of the vehicle 102 are used to capture images, including still images and/or video images. The cameras 108 can be used to capture images of objects internal to the vehicle 102 (e.g., occupants in the vehicle 102, inanimate objects in the vehicle 102, etc.) or images of objects external to the vehicle 102 (e.g., the environment on the four sides of the vehicle 102, including any other vehicles or persons that may be in the proximity of the vehicle 102).

The data logger 109 can include hardware or machine-readable instructions to log various data of the vehicle 102, such as data relating to operations of the vehicle and so forth. The data logger 109 can store the logged data in the storage system 112.

The GPS receiver 110 can provide location data relating to the vehicle 102. Although depicted as a GPS receiver, in other examples, a location receiver (different from a GPS receiver) can receive location data from other types of satellites or from other location systems, such as base stations of a cellular network, and so forth.

The storage system 112 of the vehicle 102 can be used to store vehicle-associated information 114, which can be provided by various data sources including the sensors 106, the cameras 108, the data logger 109, and a GPS receiver 110. The storage system 112 can be implemented using one or more storage devices, such as disk-based storage devices, solid state drives, and so forth.

The vehicle-associated information 114 stored in the storage system 112 can also include vehicle-associated information received from data sources external to the vehicle 102, including the RSUs 116 and the remote server 118. Examples of vehicle-associated information that can be received from the RSUs 116 include any or some combination of the following: a current state of a traffic light (e.g., whether the light is displaying red, yellow, or green), images acquired by cameras of the RSUs 116, traffic information relating to a roadway, and so forth. An RSU 116 can be located at an intersection of multiple roadways, along a side of the roadway, or at other locations near a roadway.

Vehicle-associated information that can be provided by the remote server 118 can include any or some combination of the following: traffic information of roadways, control information that controls aspects of the vehicle 102, and so forth.

The RSUs 116 and the remote server 118 are able to communicate with the vehicle 102 over respective wireless links 120 and 122, such as wireless links of a cellular network, a wireless local area network (WAN), and so forth.

The vehicle 102 includes a communication interface 124 that allows the vehicle 102 to communicate wirelessly with other endpoints, such the RSUs 116 and a remote server 118. The communication interface 124 can include a signal transceiver to transmit and receive signals, as well as one or more protocol layers that govern protocols of information communicated over the wireless links 120 and 122.

The vehicle 102 includes a vehicle network 125 to allow various components of the vehicle 102 to communicate with one another. The vehicle network 125 can include a wired network and/or a wireless network.

In accordance with some implementations of the present disclosure the vehicle-associated information filtering engine 104 controls access of vehicle-associated information from various data sources, including any of the foregoing.

The vehicle-associated information filtering engine 104 can use access control rule information 126 stored in a memory 128 of the vehicle 102. The memory 128 can be implemented using one or more memory devices, such as a dynamic random access memory (DRAM) devices, static random access memory (SRAM) devices, flash memory devices, and so forth.

The access control rule information 126 includes various access rules that govern access of various pieces of vehicle-associated information provided by any or some combination of internal or external data sources. In response to a request from an entity (internal or external to the vehicle 102) for a given piece of vehicle-associated information or when an entity asks to be apprised when vehicle-associated information changes state, the vehicle-associated information filtering engine 104 accesses one or more access rules of the access control rule information 126 to determine whether and when to grant access of the given piece of vehicle-associated information to the entity. In some cases, the entity can be an application or a program internal or external to the vehicle 102. The access control rule information 126 can include separate access control rules for different entities.

The access control rule information 126 can be provided to the vehicle 102 from an external source, such as the remote server 118. The access control rule information 126 in some examples can be dynamically updated over time.

Examples of various access rules are provided below.

Access Rules for Machine Learning Operations

The vehicle 102 also includes a computer 130 in which a machine learning (ML) model 132 is executable. A machine learning model refers to a model that can make predictions based on input data, such as based on input vehicle-associated information 134 from one or more data sources. The machine learning model 132 can produce an output that contains a prediction based on the input vehicle-associated information 134. For example, the machine learning model 132 can classify input vehicle-associated information 134 into a selected category of multiple different categories. As another example, the machine learning model 132 can produce an output value that makes a prediction (e.g., the vehicle 102 may be experiencing a fault, the vehicle 102 may be about to collide with another object, whether an object is in a proximity of the vehicle 102, an identity or presence of an occupant in the vehicle 102, an indication of an action to take (e.g., make payment when the vehicle 102 is in a proximity of an exit gate of a parking lot, activate brakes, etc.), and so forth.

The machine learning model 132 can be trained to perform its predictions. The training can be based on training data that includes various pieces of vehicle-associated information and labels assigned to the pieces of vehicle-associated information. The assigned labels can be provided by humans or other entities, and can indicate a category associated with each piece of vehicle-associated information, an output value associated with each piece of vehicle-associated information, etc. In an example, the training data can be provided to the computer 130, and the machine learning model 132 can be trained based on the training data. The machine learning model 132 can be continually trained and updated.

In accordance with some implementations of the present disclosure, the vehicle-associated information filtering engine 104 can control a characteristic of the input vehicle-associated information 134 provided as input to the machine learning model 132 based on machine learning model-related access rules of the access control rule information 126. For example, the machine learning model-related access rules can include an access rule that specifies that only a subset of designated vehicle-associated information is to be provided to the machine learning model 132.

In certain use cases, the machine learning model 132 does not have to be provided with all of the designated vehicle-associated information to perform computations of the machine learning model 132. As an example, the designated vehicle-associated information can include images (still and/or video images) of an environment around the vehicle 102. The machine learning model 132 may be a theft detection machine learning model to predict whether a theft is occurring with respect to the vehicle 102.

To predict whether theft is occurring, the theft detection machine learning model can detect presence of one or more persons around the vehicle based on images acquired by the cameras 108, and can receive sensor data indicative of a break-in, such as sound data indicative of shattered glass, opening of a door without use of a key or fob, etc. The output provided by the theft detection machine learning model is a theft indicator that can be set to a "true" value (to indicate that a vehicle theft event is present) or a "false" value (to indicate that a vehicle theft event is not present). To make its prediction, the theft detection machine learning model may not have to be provided with all of the images acquired by the cameras 108 or all of the sensor data. Rather, the theft detection machine learning model may be able to effectively make its prediction based on a sampling of the images and/or sensor data. A "sampling" of data refers to a selection of less than all of the samples of data that are available. Providing a sampling of data to the theft detection machine learning model reduces the amount of personal information made available to an application running the theft detection machine learning model, while still allowing the theft detection machine learning model to provide its predictions.

As an example, a machine learning model-related access rule can specify a sampling rate for the designated vehicle-associated information (e.g., including the images and/or sensor data noted above) to be provided to the theft detection machine learning model. The sampling rate can be defined as a percentage for example, e.g., the vehicle-associated information filtering engine 104 can select the specified percentage of all samples of the designated vehicle-associated information to be provided to the theft detection machine learning model. For example, if the machine learning model-related access rule specifies a sampling rate of 10%, then the vehicle-associated information filtering engine 104 provides 1 of every 10 samples of the designated vehicle-associated information as the input vehicle-associated information 134 to the theft detection machine learning model. In some cases, the sampling rate can vary based on factors such as the current time, the vehicle location, or whether there are moving objects around the vehicle. If the vehicle is in an area with a high crime rate or the current time is within a time period when vehicle thefts happen often (e.g., 12 am to 5 am), the sampling rate can be increased. Otherwise, a low sampling rate can be used. If the vehicle sensor detects moving objects around a parked unoccupied vehicle, the sampling rate can be increased to better capture a potential theft event.

Providing all available samples of the designated vehicle-associated information to the theft detection machine learning model may raise privacy concerns, since too much information may be provided to the theft detection machine learning model. Additionally, the theft detection machine learning model may be running within an application (e.g., a synthetic sensor) that is surreptitiously collecting information for other purposes. By limiting the data available to the application, better privacy is achieved. The theft detection machine learning model can accurately predict presence of a theft event based on just a subset of all available samples of the designated vehicle-associated information.

In other examples, other types of machine learning models 132 can be executed by the computer 130, with corresponding access rules defined in the access control rule information 126 for such other types of machine learning models 132. Examples of other types of machine learning models 132 can include a machine learning model to detect presence and/or identities of occupants in the vehicle 102, or a machine learning model to make decisions on making payments, and so forth. The access control rule information 126 can include access rules that specify different sampling rates for different machine learning models 132 executed by the computer 130.

In other use cases, such as if the machine learning model 132 is used to detect whether a collision with another vehicle or with a human is imminent, the machine learning model 132 may be provided with a continuous stream of vehicle-associated information (i.e., all available samples of vehicle-associated information, such as images captured by a camera 108 of objects in front of the vehicle 102).

In further examples, alternative or additional access rules can be included in the access control rule information 126 for machine learning models. As examples, access rules for machine learning models can include any or some combination of the following: types of vehicle-associated information to be provided to a machine learning model (e.g., a first type of vehicle-associated information is to be provided but a second type of vehicle-associated information is not to be provided), when vehicle-associated information is to be provided to a machine learning model, start and stop criteria for providing vehicle-associated information to a machine learning model (e.g., provide vehicle-associated information to the machine learning model when the start criteria are met and not provide the vehicle-associated information when the stop criteria are met), and so forth. For example, an access rule for machine learning models can specify that designated vehicle-associated information is not to be provided during daytime hours, but would be provided during nighttime hours, to protect the privacy of the driver or other users of the vehicle 102 when using the vehicle 102 during daytime hours.

Motion-Based Access Rules

In further examples, the access control rule information 126 can include an access rule based on a motion status of the vehicle 102 (a "motion-based access rule"). For example, an application (which can be run in the vehicle 102 or external to the vehicle 102) can base its operation by detecting objects in the vehicle or external to the vehicle while the vehicle is stopped. For example, an application can record images collected by the cameras 108 while the vehicle 102 is stopped (e.g., parked in a parking spot, etc.).

As another example, an application (such as a machine learning model) may perform theft detection of the vehicle 102 by looking at behavior of persons moving around the vehicle 102 while the vehicle 102 is stopped.

In such examples, the motion-based access rule can specify that the application (e.g., the theft detection application) is to be provided with images collected by the cameras 108 when the vehicle 102 is not moving, but the application is not to be provided with images collected by the cameras 108 when the vehicle 102 is moving or when the ignition is on (but vehicle is not moving).

The vehicle-associated information filtering engine 104 can monitor a speed of the vehicle 102 based on sensor data (such as from a speedometer) and can provide images (or other vehicle-associated information) to the application only if the vehicle 102 is not moving (i.e., the speed of the vehicle 102 is at zero).

In other examples, a further application (which can be run in the vehicle 102 or external to the vehicle 102) can perform computations if the vehicle 102 is moving (e.g., has a speed greater than a specified threshold). For example, the further application can compute the average speed of the vehicle 102 when the vehicle is moving (but will not factor in the computed average speed the zero speed of the vehicle 102 while stopped). In such examples, the motion-based access rule can specify that speed data to be provided to the further application if the speed of the vehicle 102 is greater than the specified threshold.

Driver Identity-Based Access Rules

In further examples, a driver behavior program (that executes in the vehicle 102 or external to the vehicle 102) can track a driving behavior of a driver of the vehicle 102. The driving behavior of the driver of the vehicle 102 can be based on measurement data from the sensors 106 of the vehicle 102 (e.g., the sensors 106 can indicate a speed and acceleration of the vehicle 102 that can indicate driver aggressiveness). The driver behavior program can also track the location of the vehicle 102 to determine where the driver has driven the vehicle 102.

In some examples, the ability to track a driving behavior of the driver can be based on the identity of the driver. The access control rule information 126 can include a driver identity-based access rule that prevents the driver behavior program from accessing designated vehicle-associated information (such as speed, acceleration, and location) if the driver has a first identity (e.g., an adult in the family), but can allow access of the designated vehicle-associated information for any other driver having another identity (e.g., a minor in the family). In that case, the parents can use the driver behavior program to monitor if the minor has a good driving behavior.

Thus, the vehicle-associated information filtering engine 104 can use the driver identity-based access rule to prevent the designated vehicle-associated information from being provided to the driver behavior program in response to detecting that the driver has the first identity (e.g., based on facial recognition of the driver, based on biometric data such as fingerprint data of the driver, etc.). The vehicle-associated information filtering engine 104 can use the driver identity-based access rule to communicate the designated vehicle-associated information to the driver behavior program in response to detecting that the driver has an identity different from the first identity.

Speed-Based Access Rules

As further examples, the access control rule information 126 can include a speed-based access rule that disables access of vehicle speed information (from a speedometer) if the speed of the vehicle 102 exceeds a first threshold. In other words, based on the speed-based access rule, the vehicle-associated information filtering engine 104 can allow a speed monitoring program (executing in the vehicle 102 or external to the vehicle 102) to access the vehicle speed information if the speed of the vehicle 102 does not exceed the first threshold. The vehicle-associated information filtering engine 104 can disable access of the speed information by the speed monitoring program if the speed of the vehicle 102 exceeds the first threshold.

In other examples, the access control rule information 126 can include a speed-based access rule that disables access of vehicle speed information (from a speedometer) if the speed of the vehicle 102 is less a second threshold. In some cases, different applications/programs may have different access control rules (e.g., different filtering requirement). Each application/program can send its filtering requirement (e.g., filtering start/stop criteria, sampling rate) to the access control rule information 126 so that the vehicle-associated information filtering engine 104 can provide corresponding filtered data. Some applications/programs may not be associated with access control rules so that such applications/programs receive unfiltered data (i.e., data not subject to filtering by the vehicle-associated information filtering engine 104).

Occupant Identifier-Based Access Rules

In further examples, an occupant tracking program (executing in the vehicle 102 or external to the vehicle 102) can track identities of occupants inside the vehicle 102, such as for identification purposes. In some cases, it may not be desired to track the identities of certain occupants of the vehicle 102, such as for privacy reasons.

The access control rule information 126 can include an occupant identifier-based access rule that specifies that user identity data (e.g., images of the interior of the vehicle 102, user identification information derived from biometric or facial recognition processes, etc.) not be provided to the occupant tracking if an occupant in the vehicle 102 has a first identity.

Thus, the vehicle-associated information filtering engine 104 can use the occupant identity-based access rule to prevent designated vehicle-associated information from being provided to the occupant tracking program in response to detecting that an occupant in the vehicle 102 has the first identity. The vehicle-associated information filtering engine 104 can use the occupant identity-based access rule to communicate the designated vehicle-associated information to the occupant tracking program in response to detecting that all occupants inside the vehicle 102 have an identity different from the first identity.

Seat-Belt Information Access Rule

In further examples, a seat-belt tracking program (executing in the vehicle 102 or external to the vehicle 102) may want to verify that occupants in the vehicle 102 are wearing their seat belts. In some examples, certain categories of drivers or passengers may be exempt from having to wear seat belts.

In such examples, the access control rule information 126 can include a seat-belt information access rule that specifies that seat-belt information not be provided for a driver or passenger of a designated category.

The vehicle-associated information filtering engine 104 can identify any occupant of the vehicle 102 that falls into the designated category, and using the seat-belt information access rule, can prevent seat-belt information (e.g., information from a sensor of a seat belt indicating whether the seat belt is engaged or not) from being communicated to the seat-belt tracking program for any occupant of the designated category. The vehicle-associated information filtering engine 104 can perform recognition of an identity of an occupant, and based on the recognized identity, determine (using correlation information, for example) whether the occupant with the identity falls in the designated category.

The vehicle-associated information filtering engine 104 can allow communication of seat-belt information for any occupant that does not fall in the designated category to the seat-belt tracking program.

Geofence-Based Access Rules

In some examples, a location determination program (executing in the vehicle 102 or external to the vehicle 102) can query location information (e.g., GPS information) to determine a location of the vehicle 102. For privacy reasons, it may not be desirable to allow the location of the vehicle 102 to be communicated to the location determination program unless the vehicle 102 is inside (or outside) a geofence. A "geofence" can refer to information defining a geographic area (which can be made up of a single geographic region or multiple geographic regions).

The access control rule information 126 can include a geofence-based access rule that controls communication of vehicle location data to the location determination program based on a relationship of a current location of the vehicle 102 to a geofence. For example, the geofence-based access rule can specify that the vehicle location data not be communicated to the location determination program if the vehicle 102 is inside or outside the geofence.

The vehicle-associated information filtering engine 104 can use the geofence-based access rule to prevent the vehicle location data from being communicated to the location determination program if the vehicle 102 is currently inside or outside the geofence. However, the vehicle-associated information filtering engine 104 can use the geofence-based access rule to allow communication of the vehicle location data to the location determination program if the vehicle 102 is currently outside or inside the geofence. Restricting the provision of vehicle location data to the location determination program according to the geofence-based access rule can be used to achieve a goal of preventing the location determination program from receiving data to determine certain locations, such as a home, work office, and so forth.

Obscuring Personal Identifying Information (PII)

In further examples, the vehicle-associated information filtering engine 104 can obscure a portion of personal identifying information (PII) when certain criteria are met. Examples of PII can include any or some combination of the following: an identity of a user, an image of a user's face, biometric data of a user, etc. Obscuring a portion of PII can include deleting the portion of PII, replacing the portion of PII with different data, hiding the portion of PII, and so forth. For example, a portion of PII is obscured if the PII falls in a designated category.

Further Examples

Note that the vehicle-associated information filtering engine 104 can apply multiple different access rules (e.g., any of the foregoing) in the access control rule information 126 to restrict communication of vehicle-associated information to an entity, whether inside or outside the vehicle 102.

Figure 2:
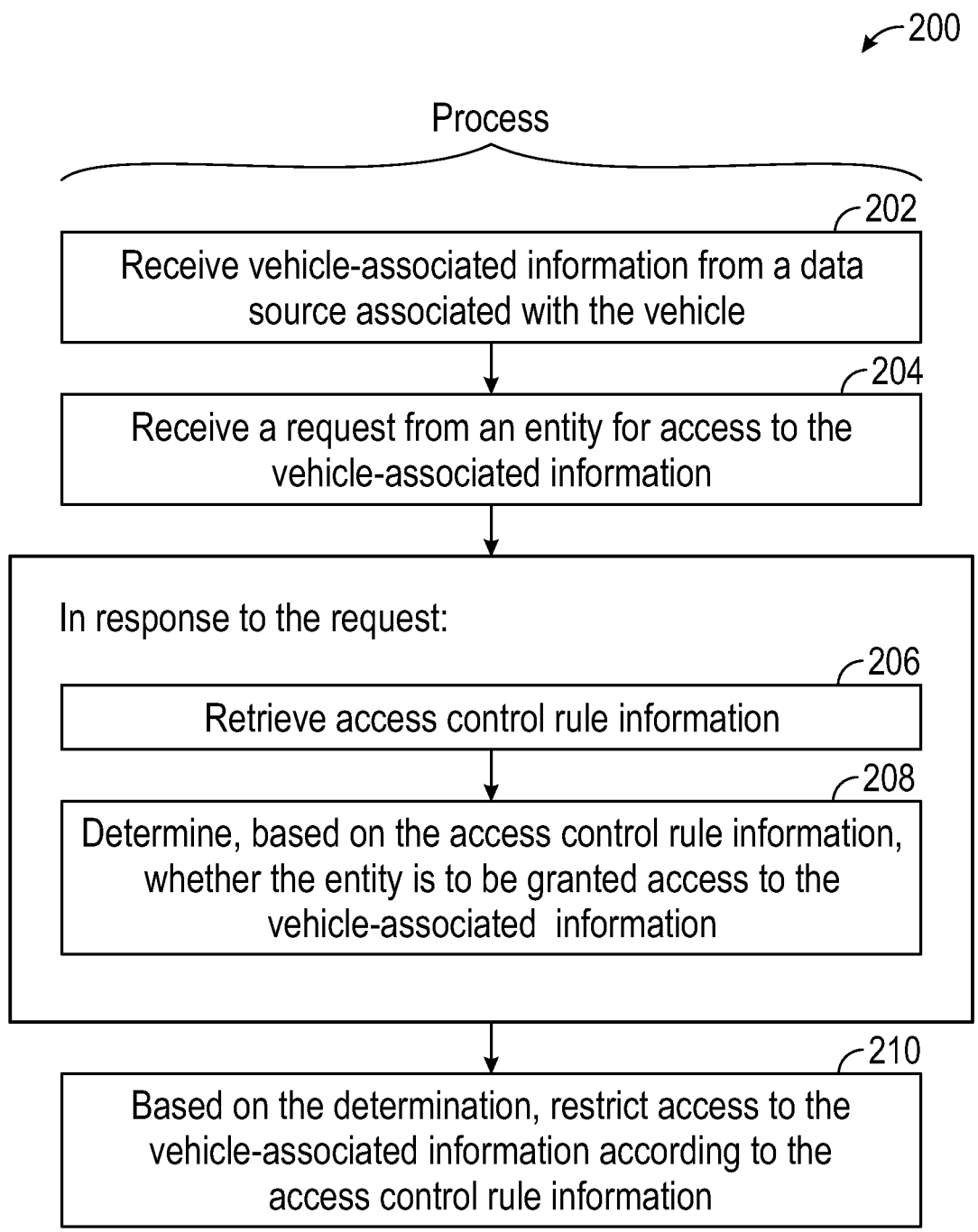
FIG. 2 is a flow diagram of a process according to some examples.

FIG. 2 is a flow diagram of a process 200 according to some examples, which may be performed by a computer system. The computer system can include a single computer or multiple computers, and can be internal or external to a vehicle (e.g., the vehicle 102).

The process 200 includes receiving (at 202) vehicle-associated information from a data source associated with the vehicle. The data source associated with the vehicle can be internal or external to the vehicle. Note also that the vehicle-associated information from the data source may be stored in a storage system prior to use by an entity inside or outside the vehicle.

The process 200 includes receiving (at 204) a request from an entity for access to the vehicle-associated information. In some examples, the entity can include the machine learning model 132 of FIG. 1, or any of the programs discussed above.

In response to the request, the process 200 includes retrieving (at 206) access control rule information (e.g., 126 in FIG. 1) and determining (at 208), based on the access control rule information whether the entity is to be granted access to the vehicle-associated information. Tasks 206 and 208 can be performed by the vehicle-associated information filtering engine 104, for example.

Based on the determination, the process 200 can restrict (at 210) access to the vehicle-associated information according to the access control rule information. In some examples, the access control rule information includes at least one privacy criterion selected from among a machine learning use criterion relating to use of the vehicle-associated information by a machine learning model, a vehicle motion criterion relating to a movement status of the vehicle, or a person identity criterion relating to an identity of a person in the vehicle. In other examples, the access control rule information can include additional or alternative criteria relating to access of vehicle-associated information.

In some examples, the machine learning use criterion can include an access rule for machine learning operations, such as any discussed above. The vehicle motion criterion can include a motion-based access rule, such as any discussed above. The person identity criterion can include a driver identity-based access rule and/or an occupant identifier-based access rule, such as any discussed above.

In further examples, the access control rule information includes a location-based criterion, such as geofence-based access rule. The process 200 can restrict access to the vehicle-associated information based on the location-based criterion by preventing access of the vehicle-associated information if the vehicle has a specified relationship with respect to (inside or outside) the geofence.

In such further examples, the process 200 can receive a request from an entity to access the vehicle-associated information, determine that the entity has a permission to access the vehicle-associated information, in response to determining that the entity has the permission, determine whether the vehicle has the specified relationship with respect to the geofence, and prevent access of the vehicle-associated information by the entity if the vehicle has the specified relationship with respect to the geofence.

The process 200 allows access of the vehicle-associated information by the entity if the vehicle does not have the specified relationship with respect to the geofence.

In some examples, the process 200 restricts access to the vehicle-associated information based on the vehicle motion criterion by preventing access of the vehicle-associated information if the vehicle is moving. In further examples, the process 200 restricts access to the vehicle-associated information based on the vehicle motion criterion by preventing access of the vehicle-associated information if the vehicle is not moving.

In some examples, the process 200 restricts access to the vehicle-associated information based on the vehicle motion criterion by preventing access of the vehicle-associated information if a speed of the vehicle has a specified relationship with respect to (exceeds or is less than) a speed threshold.

In some examples, the process 200 restricts access to the vehicle-associated information based on the person identity criterion by preventing access to the vehicle-associated information if an identity of the person in the vehicle matches a specified identity. The process 200 allows access to the vehicle-associated information if the identity of the person in the vehicle is different from the specified identity.

In some examples, the process 200 restricts access to seat-belt information based on a seat-belt information access criterion that specifies that the seat-belt information not be provided for a driver or passenger of a designated category.

Figure 3:
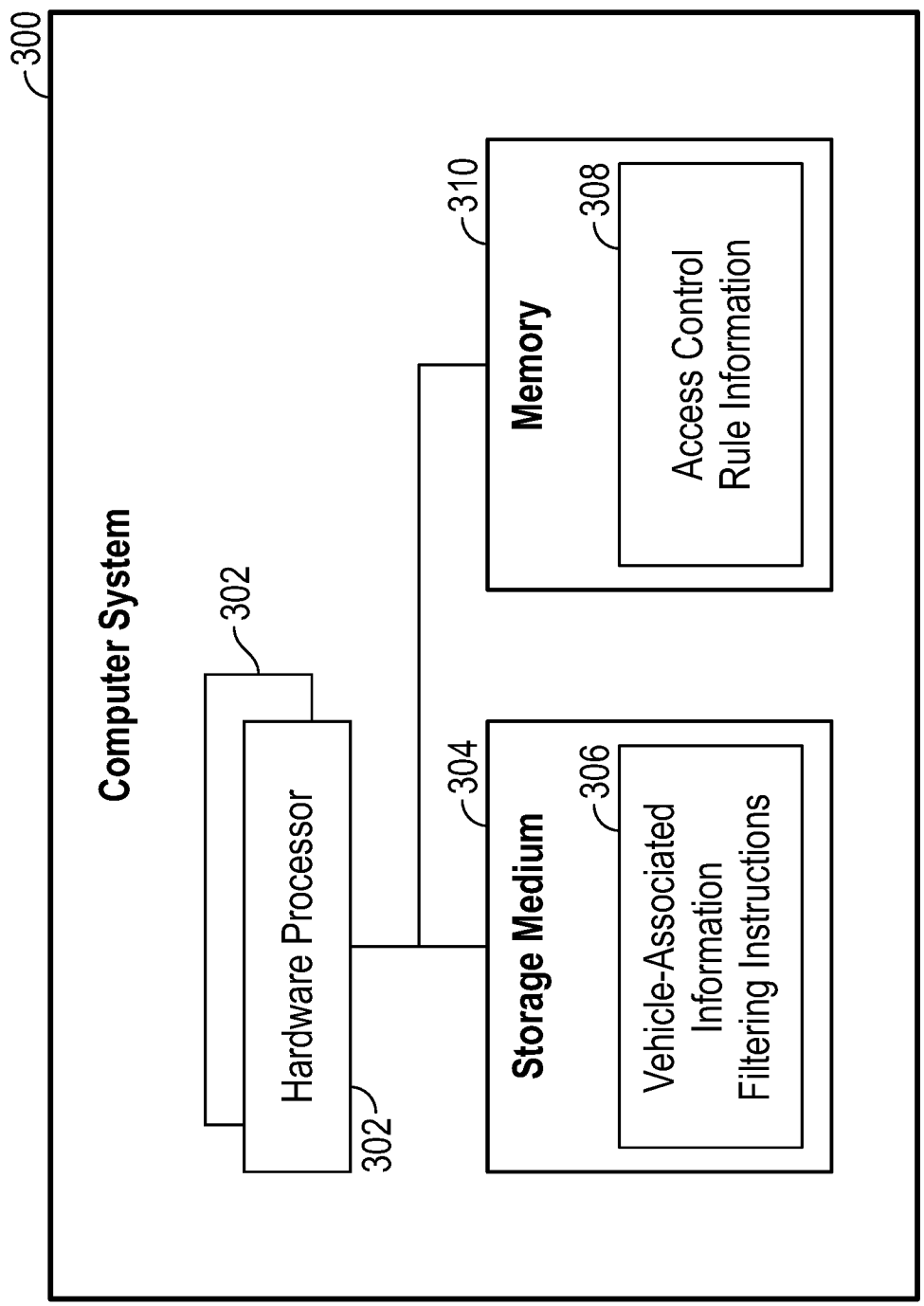
FIG. 3 is a block diagram of a computer system according to some examples.

FIG. 3 is a block diagram of a computer system 300, which can be part of or external to a vehicle, such as the vehicle 102 of FIG. 1. The computer system 300 includes one or more hardware processors 302. A hardware processor can include a microprocessor, a core of a multi-core microprocessor, a microcontroller, a programmable integrated circuit, a programmable gate array, or another hardware processing circuit.

The computer system 300 includes a non-transitory machine-readable or computer-readable storage medium 304 that stores machine-readable instructions that are executable on the one or more hardware processors 302 to perform various tasks. The machine-readable instructions include vehicle-associated information filtering instructions 306 to perform access control of vehicle-associated information. The vehicle-associated information filtering instructions 306 can be instructions of the vehicle-associated information filtering engine 104 of FIG. 1, for example.

The vehicle-associated information filtering instructions 306 can perform access control of the vehicle-associated information based on access control rule information 308 stored in a memory 310 of the computer system 300.

A storage medium (e.g. 304) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive vehicle-associated information from a data source associated with a vehicle; and
   restrict access to the vehicle-associated information based on at least one privacy criterion comprising a machine learning use criterion relating to use of the vehicle-associated information by a machine learning model, wherein the restricting of the access to the vehicle-associated information by the machine learning model comprises:
      permitting, based on the machine learning use criterion, provision of a first type of information as an input to the machine learning model, and
      blocking, based on the machine learning use criterion, a second type of information from being provided as an input to the machine learning model, wherein the second type of information is different from the first type of information.

2. The non-transitory machine-readable storage medium of claim 1, wherein the instructions upon execution cause the system to restrict the access to the vehicle-associated information based on the machine learning use criterion by controlling a sampling rate of the vehicle-associated information that is input to the machine learning model, and wherein the controlling of the sampling rate comprises:
   setting a first sampling rate of the vehicle-associated information that is input to the machine learning model based on a first location of the vehicle, and
   setting a second sampling rate of the vehicle-associated information that is input to the machine learning model based on a second location of the vehicle, the second location being different from the first location, and the second sampling rate being different from the first sampling rate.

3. The non-transitory machine-readable storage medium of claim 1, wherein the instructions upon execution cause the system to further restrict access to the vehicle-associated information based on a location-based criterion by preventing access to the vehicle-associated information if the vehicle has a specified relationship with respect to a geofence.

4. The non-transitory machine-readable storage medium of claim 3, wherein the instructions upon execution cause the system to:
   receive a request from an entity to access the vehicle-associated information;
   determine that the entity has a permission to access the vehicle-associated information;
   in response to determining that the entity has the permission, determine whether the vehicle has the specified relationship with respect to the geofence; and
   prevent access to the vehicle-associated information by the entity if the vehicle has the specified relationship with respect to the geofence.

5. The non-transitory machine-readable storage medium of claim 4, wherein the instructions upon execution cause the system to:
   allow access to the vehicle-associated information by the entity if the vehicle does not have the specified relationship with respect to the geofence.

6. The non-transitory machine-readable storage medium of claim 1, wherein the instructions upon execution cause the system to further restrict access to the vehicle-associated information based on a vehicle motion criterion by preventing access to the vehicle-associated information if the vehicle is moving, wherein the vehicle motion criterion is included in the at least one privacy criterion.

7. The non-transitory machine-readable storage medium of claim 1, wherein the instructions upon execution cause the system to further restrict access to the vehicle-associated information based on a vehicle motion criterion by preventing access to the vehicle-associated information if the vehicle is not moving, wherein the vehicle motion criterion is included in the at least one privacy criterion.

8. The non-transitory machine-readable storage medium of claim 1, wherein the instructions upon execution cause the system to further restrict access to the vehicle-associated information based on a vehicle motion criterion by preventing access to the vehicle-associated information if a speed of the vehicle has a specified relationship with respect to a speed threshold, wherein the vehicle motion criterion is included in the at least one privacy criterion.

9. The non-transitory machine-readable storage medium of claim 1, wherein the instructions upon execution cause the system to restrict the access to the vehicle-associated information based on the machine learning use criterion by controlling a sampling rate of the vehicle-associated information that is input to the machine learning model, and wherein the controlling of the sampling rate comprises adjusting the sampling rate of the vehicle-associated information that is input to the machine learning model according to a current time.

10. The non-transitory machine-readable storage medium of claim 1, wherein the instructions upon execution cause the system to restrict the access to the vehicle-associated information based on the machine learning use criterion by controlling a sampling rate of the vehicle-associated information that is input to the machine learning model, and wherein the controlling of the sampling rate comprises:
    setting a first sampling rate of the vehicle-associated information that is input to the machine learning model based on a vehicle sensor detecting a moving object around the vehicle, and
    setting a second sampling rate of the vehicle-associated information that is input to the machine learning model based on the vehicle sensor not detecting the moving object around the vehicle, the second sampling rate being different from the first sampling rate.

11. The non-transitory machine-readable storage medium of claim 1, wherein the instructions upon execution cause the system to further restrict access to the vehicle-associated information further based on a person identity criterion by controlling access to the vehicle-associated information based on comparing an identity of a person in the vehicle to a specified identity, wherein the person identity criterion is included in the at least one privacy criterion.

12. The non-transitory machine-readable storage medium of claim 11, wherein the specified identity of the person identity criterion is of a driver or an occupant of the vehicle.

13. The non-transitory machine-readable storage medium of claim 1, wherein the instructions upon execution cause the system to restrict access to seat-belt information based on a seat-belt information access criterion that specifies that the seat-belt information not be provided for a driver or passenger of a designated category.

14. The non-transitory machine-readable storage medium of claim 1, wherein the instructions upon execution cause the system to restrict access to the vehicle-associated information by obscuring personal identifying information in the vehicle-associated information.

15. The non-transitory machine-readable storage medium of claim 1, wherein the system is part of the vehicle or remotely located from the vehicle.

16. The non-transitory machine-readable storage medium of claim 1, wherein the instructions upon execution cause the system to restrict the access to the vehicle-associated information based on the machine learning use criterion by controlling a sampling rate of the vehicle-associated information that is input to the machine learning model, and wherein the controlling of the sampling rate comprises:
    detecting that the vehicle is parked and unoccupied, and
    increasing the sampling rate of the vehicle-associated information that is input to the machine learning model based on detecting that the vehicle is parked and unoccupied.

17. The non-transitory machine-readable storage medium of claim 1, wherein the data source is inside the vehicle or external to the vehicle.

18. A computer system comprising:
    one or more hardware processors; and
    a non-transitory storage medium storing instructions executable on the one or more hardware processors to:
        receive vehicle-associated information from a data source associated with a vehicle; and
        restrict access to the vehicle-associated information based on at least one privacy criterion comprising a machine learning use criterion relating to use of the vehicle-associated information by a machine learning model, wherein the restricting of the access to the vehicle-associated information by the machine learning model comprises controlling a sampling rate of the vehicle-associated information that is input to the machine learning model according to a current time, and wherein the controlling of the sampling rate comprises:
        setting a first sampling rate of the vehicle-associated information that is input to the machine learning model based on the current time being within a first time period, and setting a second sampling rate of the vehicle-associated information that is input to the machine learning model based on the current time being within a second time period, the second time period being different from the first time period, and the second sampling rate being different from the first sampling rate.

19. A method of a computer system, comprising:
    receiving, at the computer system, vehicle-associated information from a data source associated with a vehicle; and
    restricting, by the computer system, access to the vehicle-associated information based on at least one privacy criterion comprising a machine learning use criterion relating to use of the vehicle-associated information by a machine learning model, wherein the restricting of the access to the vehicle-associated information by the machine learning model comprises controlling a sampling rate of the vehicle-associated information that is input to the machine learning model, and wherein the controlling of the sampling rate comprises:
        setting a first sampling rate of the vehicle-associated information that is input to the machine learning model based on a vehicle sensor detecting a moving object around the vehicle, and setting a second sampling rate of the vehicle-associated information that is input to the machine learning model based on the vehicle sensor not detecting the moving object around the vehicle, the second sampling rate being different from the first sampling rate.

20. The computer system of claim 18, wherein the instructions are executable on the one or more hardware processors to adjust the sampling rate further based on a vehicle sensor detecting a moving object around the vehicle.

* * * * *